(12) United States Patent
Dellon

(10) Patent No.: US 12,233,543 B2
(45) Date of Patent: *Feb. 25, 2025

(54) WIRE ROUTING FOR ROBOTIC MANIPULATOR

(71) Applicant: Boston Dynamics, Inc., Waltham, MA (US)

(72) Inventor: Brian Dellon, West Roxbury, MA (US)

(73) Assignee: Boston Dynamics, Inc., Waltham, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/330,998

(22) Filed: Jun. 7, 2023

(65) Prior Publication Data

US 2023/0311346 A1 Oct. 5, 2023

Related U.S. Application Data

(63) Continuation of application No. 17/087,142, filed on Nov. 2, 2020, now Pat. No. 11,707,854.

(60) Provisional application No. 63/080,115, filed on Sep. 18, 2020.

(51) Int. Cl.
*B25J 19/00* (2006.01)
*B25J 9/10* (2006.01)
*B25J 17/02* (2006.01)

(52) U.S. Cl.
CPC .......... *B25J 19/0029* (2013.01); *B25J 9/104* (2013.01); *B25J 17/0283* (2013.01)

(58) Field of Classification Search
CPC ..... B25J 19/0029; B25J 9/104; B25J 17/0283
See application file for complete search history.

(56) References Cited

U.S. PATENT DOCUMENTS

| 4,427,170 A | 1/1984 | Truninger |
| 4,468,070 A | 8/1984 | Yasuoka |
| 5,863,010 A * | 1/1999 | Boomgaarden ........ H02G 11/02 |
| | | 439/15 |

(Continued)

FOREIGN PATENT DOCUMENTS

| JP | 2010 064157 A | 3/2010 |
| JP | 2015 054389 A | 3/2015 |

(Continued)

OTHER PUBLICATIONS

International Search Report and Written Opinion for International Application No. PCT/US2021/050249 dated Jan. 19, 2022 in 11 pages.

*Primary Examiner* — Charles A Fox
*Assistant Examiner* — Gregory T Prather
(74) *Attorney, Agent, or Firm* — Knobbe, Martens, Olson & Bear, LLP

(57) ABSTRACT

A robot includes an input link, an output link, and a wire routing. The output link is coupled to the input link at an inline twist joint where the output link is configured to rotate about the longitudinal axis of the output link relative to the input link. The wire routing traverses the inline twist joint to couple the input link and the output link. The wire routing includes an input link section, an output link section, and an omega section. A first position of the wire routing coaxially aligns at a start of the omega section on the input link with a second position of the wire routing at an end of the omega section on an output link.

20 Claims, 10 Drawing Sheets

(56) References Cited

U.S. PATENT DOCUMENTS

| | | | |
|---|---|---|---|
| 6,969,385 B2 | 11/2005 | Moreyra et al. | |
| 7,296,835 B2 | 11/2007 | Blackwell et al. | |
| 8,714,045 B2 | 5/2014 | Kim et al. | |
| 9,078,684 B2 | 7/2015 | Williams | |
| 9,180,595 B2 | 11/2015 | Inada et al. | |
| 9,492,233 B2 | 11/2016 | Williams | |
| 9,669,541 B2 | 6/2017 | Chun et al. | |
| 10,099,367 B2 | 10/2018 | Hirabayashi | |
| 11,707,854 B2 | 7/2023 | Dellon | |
| 2015/0068347 A1* | 3/2015 | Kirihara | B25J 19/0075 901/15 |
| 2019/0262985 A1 | 8/2019 | Yoshimura et al. | |

FOREIGN PATENT DOCUMENTS

| | | |
|---|---|---|
| JP | 5 001799 B2 | 8/2015 |
| JP | 2019 081235 A | 5/2019 |
| WO | WO 2022/060722 A1 | 3/2022 |

\* cited by examiner

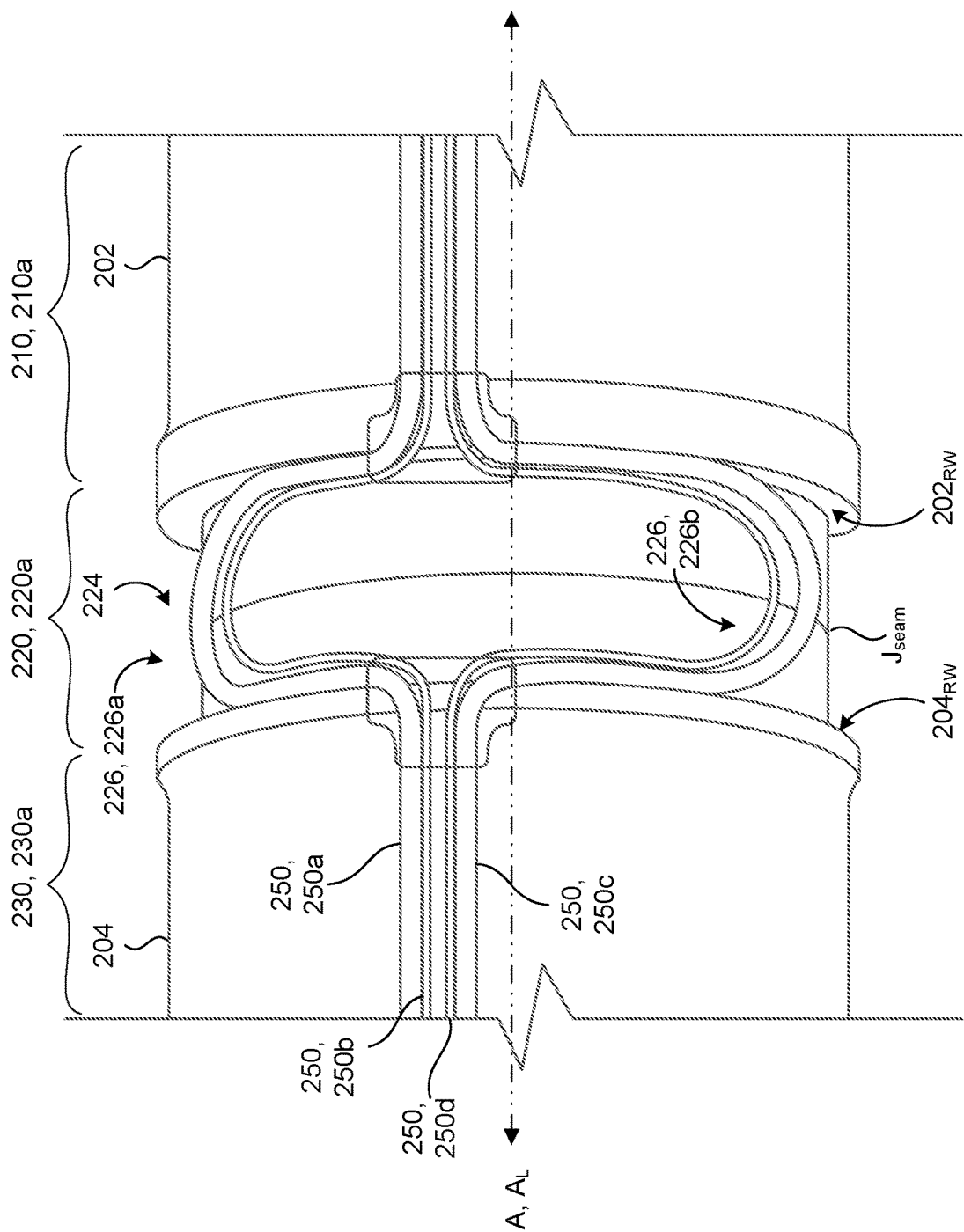

WIRE ROUTING FOR ROBOTIC MANIPULATOR

CROSS REFERENCE TO RELATED APPLICATIONS

This application is a continuation of U.S. Non-Provisional application Ser. No. 17/087,142, filed Nov. 2, 2020, which claims the benefit of U.S. Provisional Application No. 63/080,115, filed Sep. 18, 2020. The disclosure of each of these prior applications is considered part of the disclosure of this application and are hereby incorporated by reference in their entirety.

TECHNICAL FIELD

This disclosure relates to an omega wire routing.

BACKGROUND

A robot is generally defined as a reprogrammable and multifunctional manipulator designed to move material, parts, tools, or specialized devices through variable programmed motions for a performance of tasks. Robots may be manipulators that are physically anchored (e.g., industrial robotic arms), mobile robots that move throughout an environment (e.g., using legs, wheels, or traction based mechanisms), or some combination of a manipulator and a mobile robot. Robots are utilized in a variety of industries including, for example, manufacturing, transportation, hazardous environments, exploration, and healthcare. As such, the ability to program robots in a quick and an efficient manner for various behaviors provides additional benefits to such industries.

SUMMARY

One aspect of the disclosure provides a robot includes an input link, an output link, and a wire routing. The output link is coupled to the input link at an inline twist joint where the output link is configured to rotate about the longitudinal axis of the output link relative to the input link. The wire routing traverses the inline twist joint to couple the input link and the output link. The wire routing includes an input link section, an output link section, and an omega section. A first position of the wire routing coaxially aligns at a start of the omega section on the input link with a second position of the wire routing at an end of the omega section on an output link.

Implementations of the disclosure may include one or more of the following optional features. In some implementations, the robot also includes a wire routing guide coaxially aligning the first position of the wire routing with the second position of the wire routing. In some examples, the robot further includes a manipulator arm including the input link and the output link. In some configurations, the robot includes a body and four legs coupled to the body. In some examples, the wire routing is seated in a recess formed in the input link and the output link adjacent to the joint seam. The omega section of the wire routing may include an apex that aligns with a joint seam for the inline twist joint. Optionally, in the omega section, the wire routing may include a first loop and a second loop where the first loop extending in a first direction around the input link and a second direction around the output link and where the second loop extending in the second direction around the input link and the first direction around the output link, wherein the first direction is opposite the second direction.

In some configurations, in the omega section, the wire routing includes at least one wire forming a first loop where the first loop includes a first segment, a second segment, and a third segment and where a length of the loop corresponds to a range of motion for the output link to rotate about the longitudinal axis of the output link relative to the input link. In these configurations, the at least one wire may include a first wire and a second wire spaced apart at an apex of the omega section that aligns with the joint seam for the inline twist joint. The length of the loop may equal half of a total range of motion for the output link to rotate about the longitudinal axis of the output link relative to the input link.

Another aspect of the disclosure provides a method of configuring a wire routing. The method includes obtaining a wire configured to provide power or data to a component of a robotic manipulator. The robotic manipulator includes an input link and an output link where the output link is coupled to the input link at an inline twist joint and where the output link is configured to rotate about a longitudinal axis of the output link relative to the input link. The method also includes generating a wire routing for the wire by extending the wire across the inline twist joint coupling the input link and the output link. The wire routing includes an input link section, an output link section, and an omega section. The method further includes coaxially aligning a start of the omega section on the input link with a second position of the wire routing at an end of the omega section on an output link Yet another aspect of the disclosure provides a wire routing. The wire routing includes a first segment of a wire, a second segment of the wire, a third segment of the wire, a fourth segment of the wire, and a first segment of the wire. The first segment has a first length extending along a surface of an input link for a twist joint of a robot where the first length extends in a first direction parallel to a longitudinal axis of the input link. The second segment includes a first radius of curvature and has a second length where the first radius of curvature transitions the second segment of the wire from the first direction parallel to the longitudinal axis of the input link to a second direction. Here, the second direction is orthogonal to the first direction. The second length extends in the second direction circumferentially around a portion of the input link. The third segment includes a second radius of curvature and has a third length where the second radius of curvature transitions the third segment of the wire from the second direction to the first direction parallel to the longitudinal axis of the input link. The third length extends in the first direction across the twist joint to an output link for the twist joint. The fourth segment includes a third radius of curvature and has a fourth length where the third radius of curvature transitions from the fourth segment of the wire from the first direction parallel to the longitudinal axis of the input link to a third direction opposite the second direction. The third direction is orthogonal to the first direction. The fourth length extends in the third direction circumferentially around a respective portion of the output link. The fifth segment includes a fourth radius of curvature and has a fifth length, where the fourth radius of curvature transitions from the fifth segment of the wire from the third direction to the first direction parallel to the longitudinal axis of the input link. The fifth length extends along an outer surface of the output link away from the input link. An aggregate length of the wire includes the second length, the third length, and the fourth length. The aggregate length corresponds to a range of motion limit for the output link of the twist joint of the robot. This aspect may include one or more of the following optional features.

In some examples, the portion of the input link and the respective portion of the output link both include a routing channel configured to receive the wire. The routing channel may have a depth extending from an outer surface of the input link that is greater than a diameter of the wire. The input link may be a first arm member of a manipulator arm for a robot. The output link may be a second arm member of a manipulator arm for the robot. In some implementations, the second segment, the third segment, and the fourth segment form a loop where the loop includes a midpoint. Here, the midpoint corresponds to a position where the third segment crosses the twist joint from the input link to the output link. In some configurations, a portion of the first segment is affixed to the respective surface of the output link. Similarly, a portion of the fifth segment may be affixed to the respective surface of the output link. The wire routing may further include a first routing guide secured to the input link and a second wire routing guide secured to the output link where the first wire routing guide. In some examples, a portion of the first segment at least partially coaxially aligns with a respective portion of the fifth segment.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 2E and 2F are enlarged perspective views of example configurations for an omega section of the wire routing of FIG. 2A.

Like reference symbols in the various drawings indicate like elements.

DETAILED DESCRIPTION

Figure 1A:
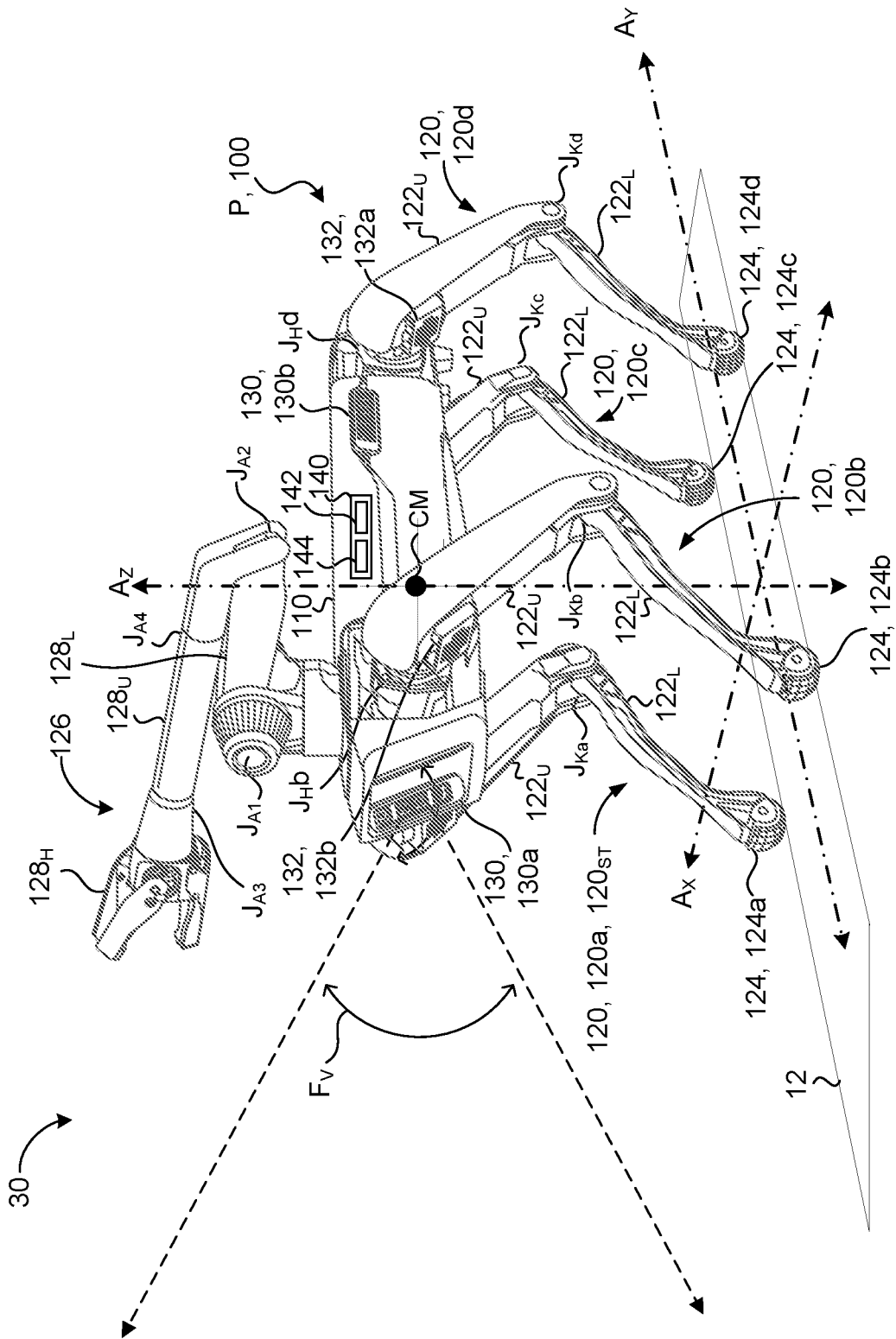
FIG. 1A is a schematic view of an example robot with a robotic arm.
Figure 1B:
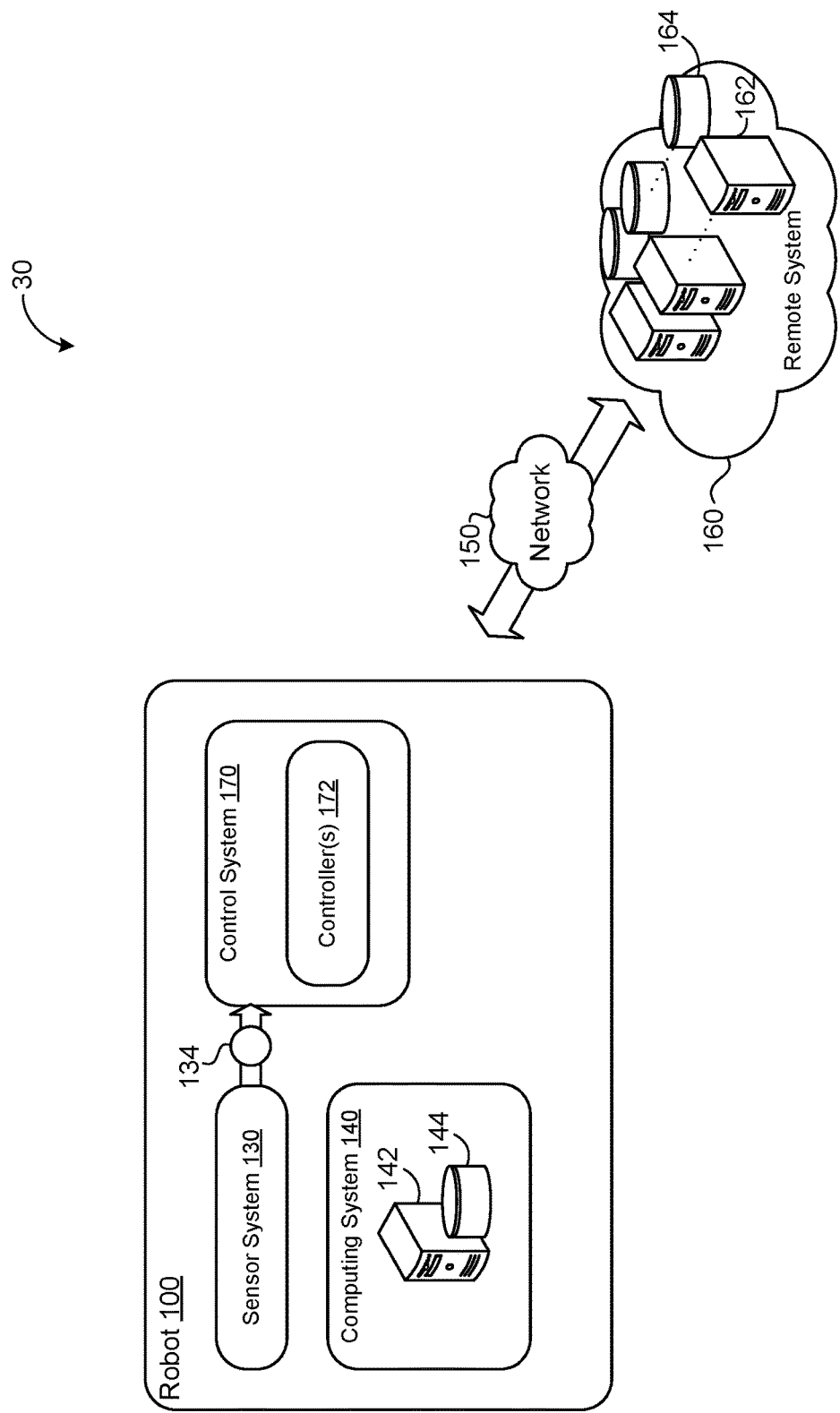
FIG. 1B is a schematic view of an example system of the robot of FIG. 1A.

Referring to FIGS. 1A and 1B, the robot 100 includes a body 110 with locomotion based structures, such as legs 120a-d, coupled to the body 110 that enable the robot 100 to move about the environment 30. In some examples, each leg 120 is an articulable structure such that one or more joints J permit members 122 of the leg 120 to move. For instance, each leg 120 includes a hip joint $J_H$ coupling an upper member 122, $122_U$ of the leg 120 to the body 110 and a knee joint $J_K$ coupling the upper member $122_U$ of the leg 120 to a lower member $122_L$ of the leg 120. Although FIG. 1A depicts a quadruped robot with four legs 120a-d, the robot 100 may include any number of legs or locomotive based structures (e.g., a biped or humanoid robot with two legs, or other arrangements of one or more legs) that provide a means to traverse the terrain within the environment 30.

In order to traverse the terrain, each leg 120 has a distal end 124 that contacts a surface of the terrain (i.e., a traction surface). In other words, the distal end 124 of the leg 120 is the end of the leg 120 used by the robot 100 to pivot, plant, or generally provide traction during movement of the robot 100. For example, the distal end 124 of a leg 120 corresponds to a foot of the robot 100. In some examples, though not shown, the distal end 124 of the leg 120 includes an ankle joint JA such that the distal end 124 is articulable with respect to the lower member $122_L$ of the leg 120.

In the examples shown, the robot 100 includes an arm 126 that functions as a robotic manipulator. The arm 126 may be configured to move about multiple degrees of freedom in order to engage elements of the environment 30 (e.g., objects within the environment 30). In some examples, the arm 126 includes one or more members 128, where the members 128 are coupled by joints J such that the arm 126 may pivot or rotate about the joint(s) J. For instance, with more than one member 128, the arm 126 may be configured to extend or to retract. To illustrate an example, FIG. 1A depicts the arm 126 with three members 128 corresponding to a lower member $128_L$, an upper member $128_U$, and a hand member $128_H$ (e.g., shown as a mechanical gripper). Here, the lower member $128_L$ may rotate or pivot about a first arm joint $J_{A1}$ located adjacent to the body 110 (e.g., where the arm 126 connects to the body 110 of the robot 100). The lower member $128_L$ is coupled to the upper member $128_U$ at a second arm joint $J_{A2}$ and the upper member $128_U$ is coupled to the hand member $128_H$ at a third arm joint $J_{A3}$. In some examples, such as FIG. 1A, the hand member $128_H$ is configured to perform different types of grasping of elements within the environment 30. In some implementations, the arm 126 additionally includes a fourth joint $J_{A4}$. The fourth joint $J_{A4}$ may be located near the coupling of the lower member $128_L$ to the upper member $128U$ and function to allow the upper member $128_U$ to twist or rotate relative to the lower member $128_L$. In other words, the fourth joint $J_{A4}$ may function as a twist joint similarly to the third joint $J_{A3}$ or wrist joint of the arm 128 adjacent the hand member $128_H$. For instance, as a twist joint, one member coupled at the joint J may move or rotate relative to another member coupled at the joint J (e.g., a first member coupled at the twist joint is fixed while the second member coupled at the twist joint rotates). In some implementations, the arm 126 connects to the robot 100 at a socket on the body 110 of the robot 100. The socket may be configured as a connector such that the arm 126 may attach or detach from the robot 100 depending on whether the arm 126 is needed for operation.

The robot 100 has a vertical gravitational axis (e.g., shown as a Z-direction axis $A_Z$) along a direction of gravity, and a center of mass CM, which is a position that corresponds to an average position of all parts of the robot 100 where the parts are weighted according to their masses (i.e., a point where the weighted relative position of the distributed mass of the robot 100 sums to zero). The robot 100 further has a pose P based on the CM relative to the vertical gravitational axis $A_Z$ (i.e., the fixed reference frame with respect to gravity) to define a particular attitude or stance assumed by the robot 100. The attitude of the robot 100 can be defined by an orientation or an angular position of the robot 100 in space. Movement by the legs 120 relative to the body 110 alters the pose P of the robot 100 (i.e., the combination of the position of the CM of the robot and the attitude or orientation of the robot 100). Here, a height generally refers to a distance along the z-direction. The sagittal plane of the robot 100 corresponds to the Y-Z plane extending in directions of a y-direction axis $A_Y$ and the z-direction axis $A_Z$. In other words, the sagittal plane bisects the robot 100 into a left and a right side. Generally perpendicular to the sagittal plane, a ground plane (also referred to as a transverse plane) spans the X-Y plane by extending in directions of the x-direction axis $A_X$ and the y-direction axis $A_Y$. The ground plane refers to a ground surface 12 where distal ends 124 of the legs 120 of the robot 100 may generate traction to help the robot 100 move about the environment 30. Another anatomical plane of the robot 100 is the frontal plane that extends across the body 110 of the robot 100 (e.g., from a left side of the robot 100 with a first leg 120a to a right side of the robot 100 with a second leg 120b). The frontal plane spans the X-Z plane by extending in directions of the x-direction axis $A_X$ and the z-direction axis $A_Z$.

In order to maneuver about the environment 30 or to perform tasks using the arm 126, the robot 100 includes a sensor system 130 with one or more sensors 132, 132a-n (e.g., shown as a first sensor 132, 132a and a second sensor 132, 132b). The sensors 132 may include vision/image sensors, inertial sensors (e.g., an inertial measurement unit (IMU)), force sensors, and/or kinematic sensors. Some examples of sensors 132 include a camera such as a stereo camera, a scanning light-detection and ranging (LIDAR) sensor, or a scanning laser-detection and ranging (LADAR) sensor. In some examples, the sensor 132 has a corresponding field(s) of view $F_V$ defining a sensing range or region corresponding to the sensor 132. For instance, FIG. 1A depicts a field of a view $F_V$ for the robot 100. Each sensor 132 may be pivotable and/or rotatable such that the sensor 132 may, for example, change the field of view $F_V$ about one or more axis (e.g., an x-axis, a y-axis, or a z-axis in relation to a ground plane).

When surveying a field of view $F_V$ with a sensor 132, the sensor system 130 generates sensor data 134 (also referred to as image data) corresponding to the field of view $F_V$. In some examples, the sensor data 134 is image data that corresponds to a three-dimensional volumetric point cloud generated by a three-dimensional volumetric image sensor 132. Additionally or alternatively, when the robot 100 is maneuvering about the environment 30, the sensor system 130 gathers pose data for the robot 100 that includes inertial measurement data (e.g., measured by an IMU). In some examples, the pose data includes kinematic data and/or orientation data about the robot 100, for instance, kinematic data and/or orientation data about joints J or other portions of a leg 120 or arm 126 of the robot 100. With the sensor data 134, various systems of the robot 100 may use the sensor data 134 to define a current state of the robot 100 (e.g., of the kinematics of the robot 100) and/or a current state of the environment 30 about the robot 100.

In some implementations, the sensor system 130 includes sensor(s) 132 coupled to a joint J. Moreover, these sensors 132 may couple to a motor M that operates a joint J of the robot 100 (e.g., sensors 132, 132a-b). Here, these sensors 132 generate joint dynamics in the form of joint-based sensor data 134. Joint dynamics collected as joint-based sensor data 134 may include joint angles (e.g., an upper member $122_U$ relative to a lower member $122_L$ or hand member $126_H$ relative to another member of the arm 126 or robot 100), joint speed (e.g., joint angular velocity or joint angular acceleration), and/or forces experienced at a joint J (also referred to as joint forces). Joint-based sensor data generated by one or more sensors 132 may be raw sensor data, data that is further processed to form different types of joint dynamics, or some combination of both. For instance, a sensor 132 measures joint position (or a position of member(s) 122 coupled at a joint J), and systems of the robot 100 perform further processing to derive velocity and/or acceleration from the positional data. In other examples, a sensor 132 is configured to measure velocity and/or acceleration directly.

As the sensor system 130 gathers sensor data 134, a computing system 140 stores, processes, and/or to communicates the sensor data 134 to various systems of the robot 100 (e.g., the control system 170 and/or the maneuver system 300). In order to perform computing tasks related to the sensor data 134, the computing system 140 of the robot 100 includes data processing hardware 142 and memory hardware 144. The data processing hardware 142 is configured to execute instructions stored in the memory hardware 144 to perform computing tasks related to activities (e.g., movement and/or movement based activities) for the robot 100. Generally speaking, the computing system 140 refers to one or more locations of data processing hardware 142 and/or memory hardware 144.

In some examples, the computing system 140 is a local system located on the robot 100. When located on the robot 100, the computing system 140 may be centralized (i.e., in a single location/area on the robot 100, for example, the body 110 of the robot 100), decentralized (i.e., located at various locations about the robot 100), or a hybrid combination of both (e.g., where a majority of centralized hardware and a minority of decentralized hardware). To illustrate some differences, a decentralized computing system 140 may allow processing to occur at an activity location (e.g., at motor that moves a joint of a leg 120) while a centralized computing system 140 may allow for a central processing hub that communicates to systems located at various positions on the robot 100 (e.g., communicate to the motor that moves the joint of the leg 120).

Additionally or alternatively, the computing system 140 includes computing resources that are located remotely from the robot 100. For instance, the computing system 140 communicates via a network 150 with a remote system 160 (e.g., a remote server or a cloud-based environment). Much like the computing system 140, the remote system 160 includes remote computing resources such as remote data processing hardware 162 and remote memory hardware 164. Here, sensor data 134 or other processed data (e.g., data processing locally by the computing system 140) may be stored in the remote system 160 and may be accessible to the computing system 140. In some examples, the computing system 140 is configured to utilize the remote resources 162, 164 as extensions of the computing resources 142, 144 such that resources of the computing system 140 may reside on resources of the remote system 160.

In some implementations, as shown in FIGS. 1A and 1B, the robot 100 includes a control system 170. The control system 170 may be configured to communicate with systems of the robot 100, such as the at least one sensor system 130. The control system 170 may perform operations and other functions using hardware 140. The control system 170 includes at least one controller 172 that is configured to control the robot 100. For example, the controller 172 controls movement of the robot 100 to traverse about the environment 30 based on input or feedback from the systems of the robot 100 (e.g., the sensor system 130 and/or the control system 170). In additional examples, the controller 172 controls movement between poses and/or behaviors of the robot 100. At least one controller 172 may be responsible for controlling movement of the arm 126 of the robot 100 in order for the arm 126 to perform various tasks using the hand member $128_H$. For instance, at least one controller 172 controls an end effector or actuators of the end effect in order to use the hand member $128_H$ to manipulate an object or element in the environment 30.

A given controller 172 may control the robot 100 by controlling movement about one or more joints J of the robot 100. In some configurations, the given controller 172 is software with programming logic that controls at least one joint J or a motor M which operates, or is coupled to, a joint J. For instance, the given controller 172 controls an amount of force that is applied to a joint J (e.g., torque at a joint J). As programmable controllers 172, the number of joints J that a controller 172 controls is scalable and/or customizable for a particular control purpose. A controller 172 may control a single joint J (e.g., control a torque at a single joint J), multiple joints J, or actuation of one or more members 128 (e.g., actuation of the hand member $128_H$) of the robot 100. By controlling one or more joints J, actuators (e.g., the actuator 300), or motors M, the controller 172 may coordinate movement for all different parts of the robot 100 (e.g., the body 110, one or more legs 120, the arm 126). For example, to perform some movements or tasks, a controller 172 may be configured to control movement of multiple parts of the robot 100 such as, for example, two legs 120a-b, four legs 120a-d, or two legs 120a-b combined with the arm 126.

Referring to FIGS. 2A-2F, the arm 126 of the robot 100 includes a wire routing 200. A wire routing or cable routing generally refers to a structure or path for one or more wires. A wire routing is often used in industrial applications or other wiring situations to limit the stress and/or strain that one or more wires experience as these wires connect from one point to another. Referring more specifically to robotic manipulators such as the arm 126, one or more wires may span the length of the arm 126 or some portion thereof to provide power and/or data signals to components of the manipulator. For example, wire(s) within the wire routing 200 deliver power or data to one or more motors and/or actuators (e.g., end-effector actuators) that enable the arm 126 to perform manipulation tasks. Typically, protecting a wire routing along a manipulator of a robot often proves difficult due to the fact that a manipulator may have multiple joints that may twist or move during manipulation tasks. In other words, wires routed along the arm 126 may be in some constant state of stress or strain, especially when a manipulator has a large range of motion in several degrees of freedom. To avoid some of this stress or strain, some actuators of a manipulator may be designed with a requirement to force a wire or cable through the actuator or other power delivering component of a manipulator. Although this may prevent some of the stress or strain to the wire(s), forcing a wire or a cable through an actuator has its own negative downstream effects. For example, by generating an open space in an actuator, the open space diminishes some degree of an actuator's torque density. Since the torque density for an actuator is often important for the design of a manipulator to perform various tasks (e.g., industrial tasks requiring high torque), an actuator with a through hole will need to inevitably be larger to offset the torque density loss. This often results in a heavier and more expensive actuator to be required in this scenario. Furthermore, the wiring in a manipulator may be one of the more serviced items in a manipulator due to the constant state of stress and strain. By taking an approach to route wires through components of a manipulator, this approach inherently may lead to greater service downtimes because service would require a greater degree of structural deconstruction and/or reconstruction. In sum, having a wire routing that travels through components of the manipulator that provide torque or other forces is not desirable.

Figure 2A:
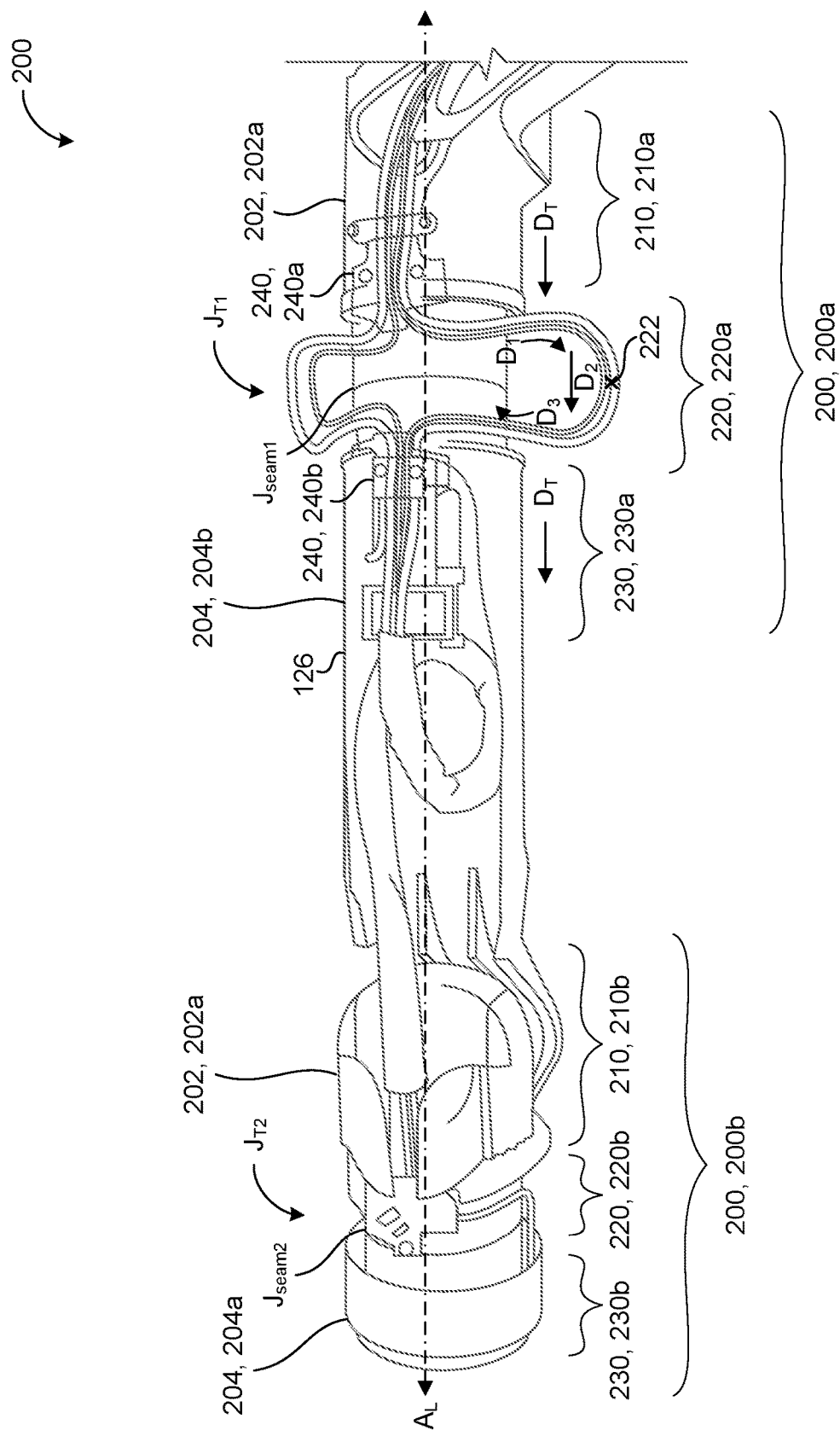
FIG. 2A is a perspective view of an example robotic arm with a wire routing traversing a twist joint.

In some examples, the wire routing 200 is a wire routing that traverses an inline twist joint $J_T$. For example, the arm 126 is shown in FIG. 2A to include a first twist joint $J_{T1}$ and a second twist joint $J_{T2}$ corresponding to the third arm joint $J_{A3}$ and the fourth arm joint $J_{A4}$ shown in FIG. 1A. A twist joint $J_T$ refers to a joint J that provides rotary motion where the axis of rotation for the rotary motion is parallel to axes of an input link of the joint J and an output link for the joint J. An example of a common twist joint $J_T$ is a wrist joint J where a hand member $128_H$ or end effector rotates by the rotary motion of twisting while a link (e.g., the upper member $128_U$ akin to a forearm member of the arm 126) proceeding the wrist joint J remains relatively fixed. Here, the hand member $128_H$ or end effector operates as the output link and the forearm operates as the input link. A twist joint $J_T$ may be in contrast to a revolute joint J where an axis of rotation for a revolute joint J is parallel to the axis of rotation of the joint and the axis of the output link is generally perpendicular to the axis of rotation. In some examples, a twist joint $J_T$ such as an inline twist joint $J_T$ is a joint where the input link and the output link share a longitudinal axis. In some implementations, an inline twist joint is also constructed such that an outer surface of the input link is coplanar with an outer surface of the output link to make a portion of the arm 126 appear relatively seamless (e.g., contiguous) other than the joint seam of the twist joint $J_T$ itself.

Referring to FIG. 2A, at each twist joint $J_T$, the wire routing 200 includes an input link section 210, an omega section 220, and an output link section 230. Here, an input link 202 of the arm 126 is coupled to an output link 204 of the arm 126 at a twist joint $J_T$ such that the input link 202 remains fixed or relatively stationary while the output link 204 rotates. In the design shown in FIG. 2A, the input link 202 and the output link 204 are coaxial and the output link 204 rotates about this coaxial axis (e.g., shown as a longitudinal axis $A_L$ of the arm 126). For an inline twist joint $J_T$, a joint seam $J_{seam}$ is the portion of the twist joint $J_T$ that corresponds to a boundary that divides the input link 202 and the output link 204. For instance, FIG. 2A illustrates a first joint seam $J_{seam1}$ at the first twist joint $J_{T1}$ dividing a first input link 202a from a first output link 204a. Similarly, a second joint seam $J_{seam2}$ at the second twist joint $J_{T2}$ divides a second input link 202b from a second output link 204b.

The input link section 210 refers to a section of the wire routing 200 that traverses the input link 202 while the output link section 220 refers to a section of the wire routing 200 that traverses the output link 204. In some examples, the wire routing 200 is a relatively low profile structure with a path that travels along a surface of the arm 126 of the robot 100. For example, the wire routing 200 travels along a surface (e.g., an outer surface) of the first input link 210a towards the joint seam $J_{seam}$. During the path of the wire routing 200 towards the joint seam $J_{seam}$, the input link section 210 transitions to the omega section 220 where the wire routing 200 changes its direction of travel DT, from traveling along the longitudinal axis A, $A_L$ of the arm 126, to wrap some degree around the longitudinal axis $A_L$ in a first direction $D_1$ prior to the joint seam $J_{seam}$ on the input link 202. In the omega section 220, the wire routing 200 crosses the joint seam $J_{seam}$ from the input link 202 to the output link 204 by again changing its direction of travel to cross the joint seam $J_{seam}$. To traverse across the joint seam $J_{seam}$ from the input link 202 to the output link 204, the wire routing 200 changes direction from the first direction $D_1$ to a second direction $D_2$ where the second direction $D_2$ is once again traveling along the longitudinal axis $A_L$ of the arm 126. After crossing the joint seam $J_{seam}$ from the input link 202 to the output link 204, the wire routing 200 again changes its direction of travel, from traveling along the longitudinal axis A, $A_L$ of the arm 126 in the second direction $D_2$ to cross the joint seam $J_{seam}$, to wrap some degree around the longitudinal axis $A_L$ in a third direction $D_3$ opposite the first direction $D_1$. When traveling in the third direction $D_3$, the wire routing 200 wraps some degree around the output link 204. After wrapping some degree around the output link 204 in the third direction $D_3$, the wire routing 200 transitions from the omega section 220 to the output link section 204. During this transition, the wire routing 200 changes directions from the third direction $D_3$ around the longitudinal axis $A_L$ of the arm 126 back to a direction of travel DT along the longitudinal axis $A_L$ of the arm 126. In other words, while the wire routing 200 is in the input link section 210 or the output link section 230, the path that the wire routing 200 traverses is along the longitudinal axis of the arm 126 (or more particularly the longitudinal axes of both the input link 202 and the output link 204). Yet while in the omega section 230, the path of the wire routing 200 forms a shape that generally resembles a loop or the greek symbol omega "Ω." During the omega section 220, the path of the wire routing 200 changes direction four times (e.g., twice along the input link 202 and twice along the output link 204). Moreover, in the omega section 220, the wire routing 200 crosses the joint seam $J_{seam}$ at the crest or apex 222 of the omega shape (e.g., as shown in FIG. 2A). In some configurations, the position of the wire routing 200 when it enters the omega section 220 (i.e., at the input link 202) is coaxial to the position of the wire routing 200 as it exits the omega section 220 (i.e., at the output link 204). In other words, a first position of the wire routing 200 at the start of the omega section 220 on the input link 202 coaxially aligns (meaning share the same axis) with a second position of the wire routing 200 at an end of the omega section 220 of the output link 204. Another way to think about this coaxial relationship is that the shape of the greek symbol omega "Ω" has two feet that contact the base line along the bottom of this greek letter/symbol Ω. At the base line, the feet of the Ω are coaxial or share an axis with each other that is the base line. For clarification, neither the input link section 210 nor the output link section 230 include an entirety of the input link 202 and output link 204, respectively, since the omega section 220 includes some portion of both of the input link 202 and the output link 204 to allow the wire routing 200 to wrap around the longitudinal axis $A_L$ of the arm 126.

Although the wire routing 200 changes direction several times during the omega section 220, the wire routing 200 maintains a relatively soft bend radius throughout its path. By maintaining a relatively soft bend radius along the path of the wire routing 200, the path of the wire routing 200 helps to minimize stress and/or strain on the wire(s) of the wire routing 200. This reduced stress and/or strain may decrease service frequency and/or increase cycle lifetime of the wire(s) within the wire routing 200. In some examples, the bend radius during a change of direction for the wire routing 200 along its path does not exceed ninety degrees. In some implementations, the wire routing 200 includes a routing guide 240 to ensure a particular bend radius as the wire routing 200 changes directions. For example, the wire routing 200 includes a routing guide 240 when the wire routing 200 transitions into and/or out of the omega section 220 of the wire routing 200. To illustrate, FIG. 2A includes a first routing guide 240, 240a when the wire routing 200 transitions from the input link section 210 to the omega section 220 and a second routing guide 240, 240b when the wire routing 200 transitions from the omega section 220 to the output link section 230.

The routing guide 240 may be a relatively stiff component with one or more tracks or grooves to steer each wire of the wire routing 200 along a particular bend radius. In some examples, the routing guide 240 is located where when the wire routing transitions either into or out of the omega section 220 because the routing guide 240 acts to guide the wire routing 200 through a direction change and also guide the wire routing 200 to wrap around one of the input link 202 or the output link 204. In some examples, to provide rigidity and to fix the routing guide 240 at a particular location, each routing guide 240 is fastened or otherwise bonded to one of the input link 202 or the output link 204. By fastening or otherwise bonding a routing guide 240 to the output link 204, the rotation of the output link 204 in either direction about the longitudinal axis $A_L$ will cause the routing guide 240 to wind and/or to unwind the wrapped portion of the wire routing 200 on either side of the joint seam $J_{seam}$. For example, the speed of rotation of the output link 204 causes the wire routing 200 at the apex 222 of the omega section 220 to move at a speed of about half the speed of rotation of the output link 204.

In some configurations, the wire routing 200 is configured to be covered by a service panel to prevent direct exposure of the entirety of the wire routing 200 during use of the robot 100. Even though some portion of the wire routing 200 may be covered by a service panel, the wire routing 200 may generally resides near a surface of the arm 126 to allow ease of maintenance on wire(s) of the wire routing 200. For instance, although the wire routing 200 may not be exposed on an overall outer surface of the arm 126, the wire routing 200 may nonetheless reside against or adjacent to an outer surface of the arm 126. In some examples, where the wire routing 200 crosses a twist joint seam $J_{seam}$, the wire routing 200 cannot be covered by a service panel or other covering in order to enable the twist joint $J_T$ to operate effectively. Here, the omega section 220 occurs in the area about (e.g., on either side of and including) the twist joint seam $J_{seam}$ to enable portions of the wire routing 200 that are wrapped around either or both of the input and output link 202, 204, to wind and/or to unwind without restricting the twist joint $J_T$ in its designated range of motion (ROM). In other words, the omega section 220 of the wire routing 200 acts like a virtual pulley as the output link 204 rotates around the longitudinal axis $A_L$. Additionally, by wrapping around some portion of either or both of the input link 202 or the output link 204 in the omega section 220, the wire routing 200 that is exposed in the area of the twist joint $J_T$ may generally extend along a surface of the arm 126 instead of protruding from the surface of the arm 126 and being susceptible to interfere with (e.g., to snag or to catch) something in the environment 30 (e.g., during operation). In other words, although FIG. 2A depicts the omega section 230 protruding from the surface of the arm 126, this protrusion is exaggerated for ease of explanation. The wire routing 200 typically resembles FIGS. 2B-2F to try to minimize issues caused by protruding from the surface of the arm 126.

Figure 2B:
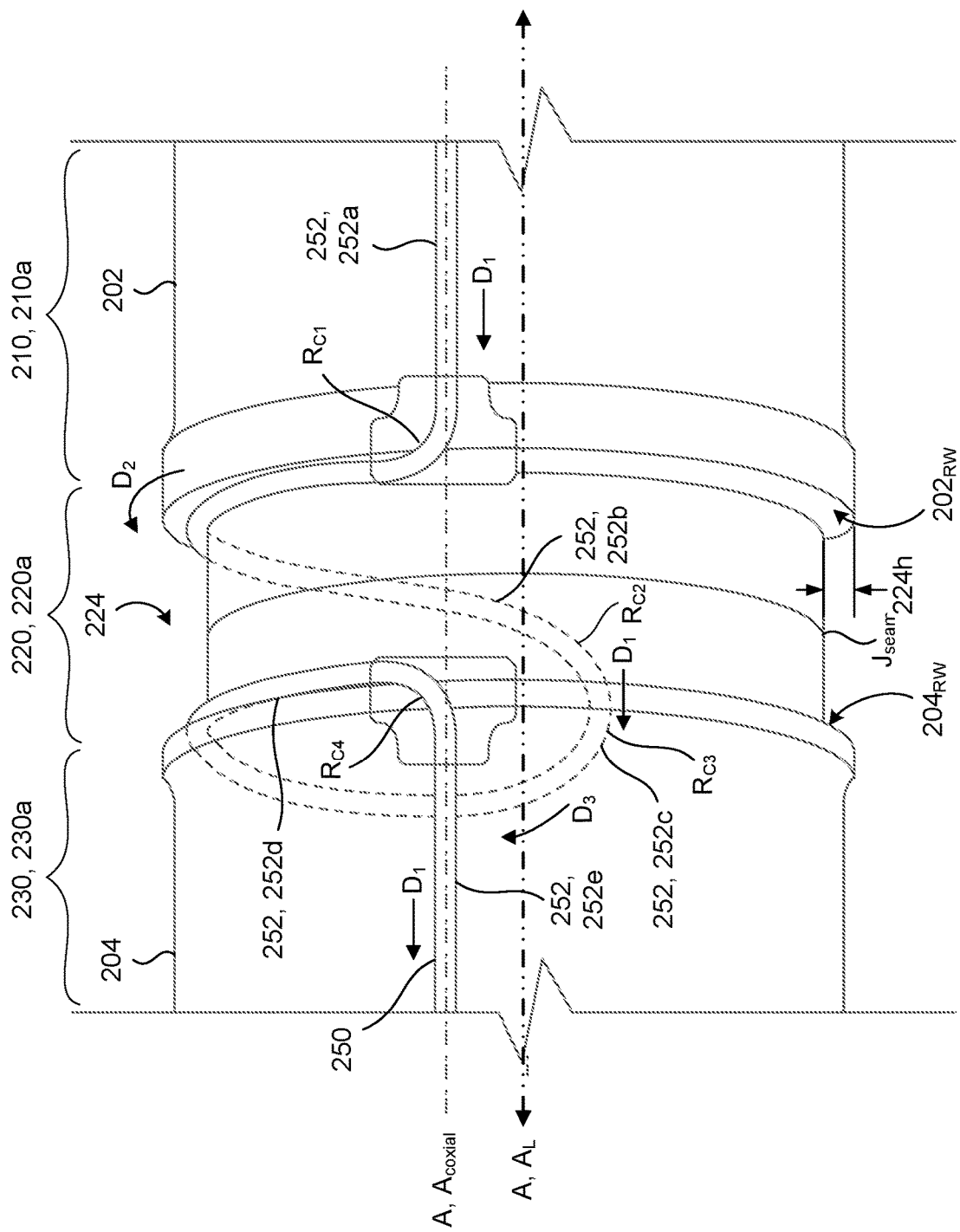
FIGS. 2B-2D are enlarged perspective views of the wire routing of FIG. 2A at different stages in a range of motion for an output link of the arm.
Figure 2C:
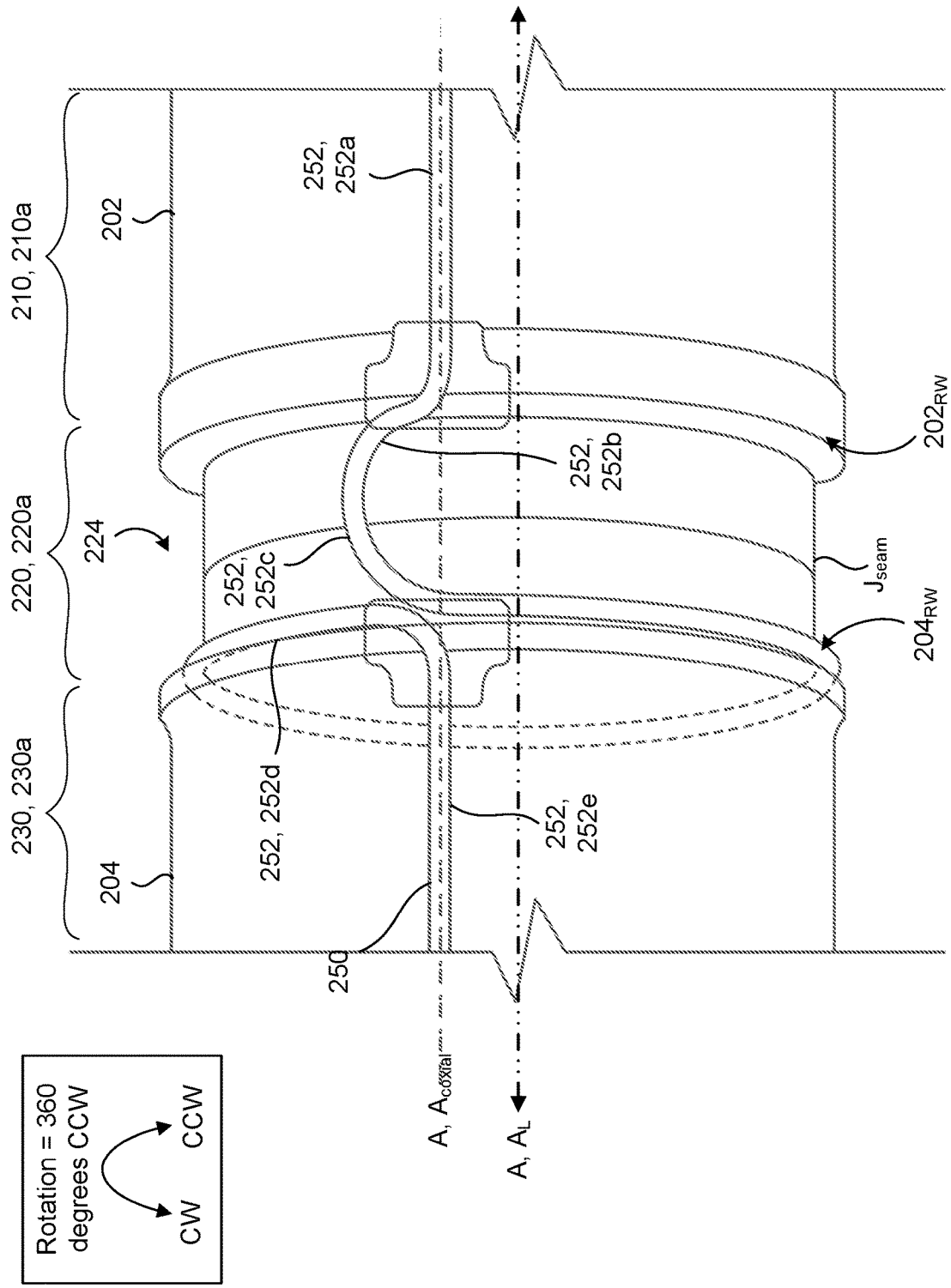
Figure 2D:
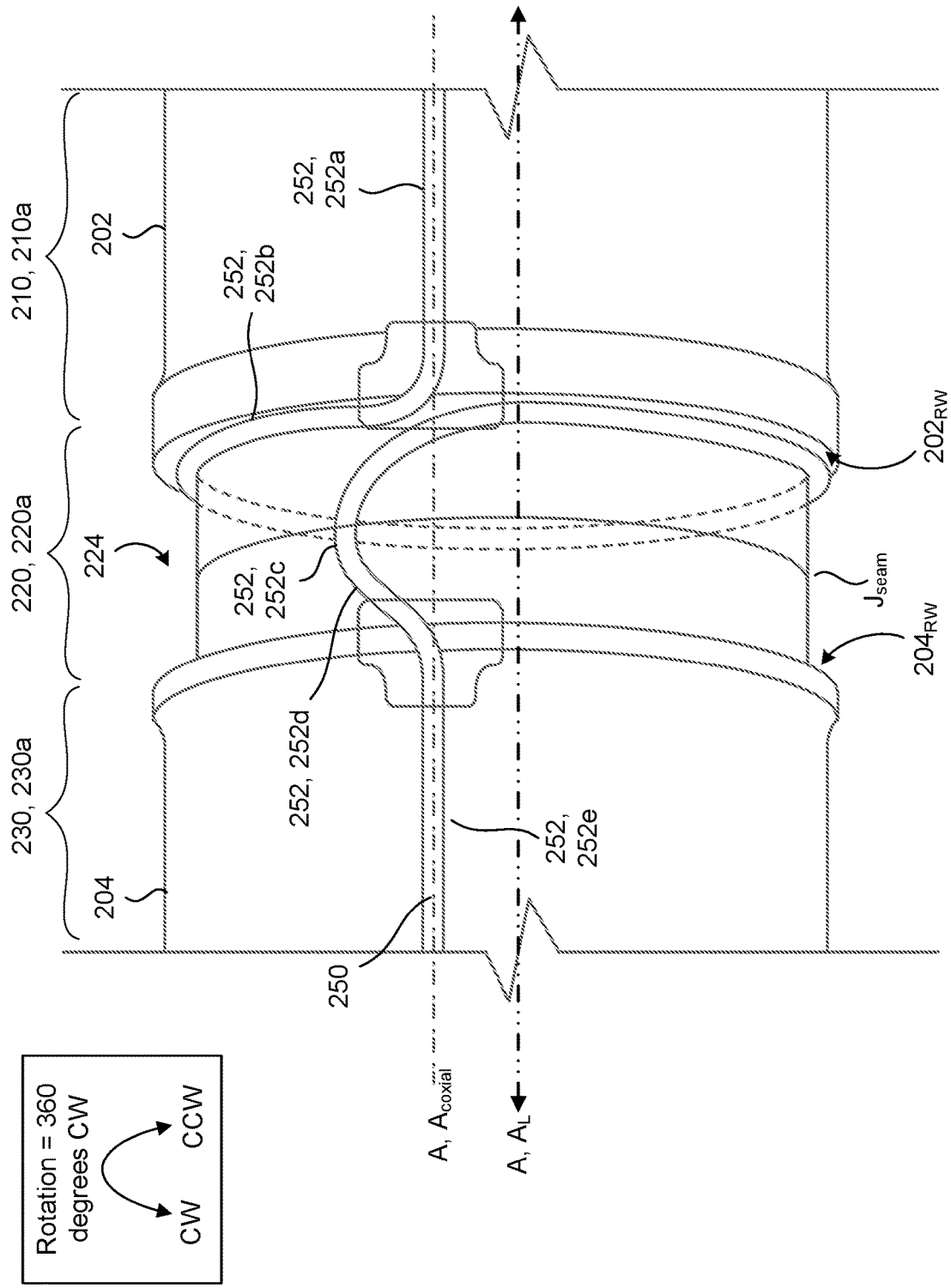

The wire routing 200 may include one or more wires 250 or cables. Each wire 250 or cable may correspond to one or more conductors configured to deliver power and/or data signals between two points. For instance, FIGS. 2B-2D illustrate the wire routing 200 with a single wire 250. Here, the wire 250 includes five segments 252, 252a-e where each segment 252 has a length and extends in a particular direction. The first segment 252a has a first length that extends along a surface of the input link 202 towards the joint seam $J_{seam}$ of the twist joint $J_T$. Here, the first length of the first segment 252a of wire 250 extends in a first direction $D_1$ parallel to the longitudinal axis $A_L$ of the input link 202 (or the arm 126). The second segment 252b of the wire 250 includes a first radius of curvature $R_{C1}$ and has a second length. Here, the second length may generally correspond to a length that the second segment 252b that wraps around the input link 202 prior to the joint seam $J_{seam}$. The first radius of curvature $R_{C1}$ corresponds to a portion of the wire 250 that transitions the second segment 252b of wire 250 from the first direction $D_1$ parallel to the longitudinal axis $A_L$ of the input link 202 to a second direction $D_2$. Here, the second direction $D_2$ is orthogonal to the first direction $D_1$ such that the second segment 252b extends in the second direction $D_2$ circumferentially around the input link 202 (e.g., around the longitudinal axis $A_L$). The third segment 252c of wire 250 includes a second radius of curvature $R_{C2}$ and has a third length. The second radius of curvature $R_{C2}$ transitions the third segment 252c of the wire 250 from the second direction $D_2$ to the first direction $D_1$. The third segment 252c extends across the joint seam $J_{seam}$ when the third segment 252c extends in the first direction $D_1$. The fourth segment 252d of wire 250 has a fourth length and may include a third radius of curvature $R_{C3}$. The third radius of curvature $R_{C3}$ transitions the fourth segment 252d of the wire 250 from the first direction $D_1$ to a third direction $D_3$ where the third direction $D_3$ is opposite the second direction $D_2$. The third direction $D_3$ may be orthogonal to the first direction $D_1$ such that the fourth segment 252d extends circumferentially around a portion of the output link 204 after the joint seam $J_{seam}$. In some examples, the third radius of curvature $R_{C3}$ is equal to the second radius of curvature $R_{C2}$. The fifth segment 252e of the wire 250 includes a fourth radius of curvature $R_{C4}$ and has a fifth length. The fourth radius of curvature $R_{C4}$ transitions from the fifth segment 252e of the wire 250 from the third direction $D_3$ to the first direction $D_1$ parallel to the longitudinal axis $A_L$ axis of the output link 204 (and e.g., the input link 202, when in-line). In some implementations, the fifth segment 252e extends along an outer surface of the output link 204 away from the input link 202.

Figure 2E:
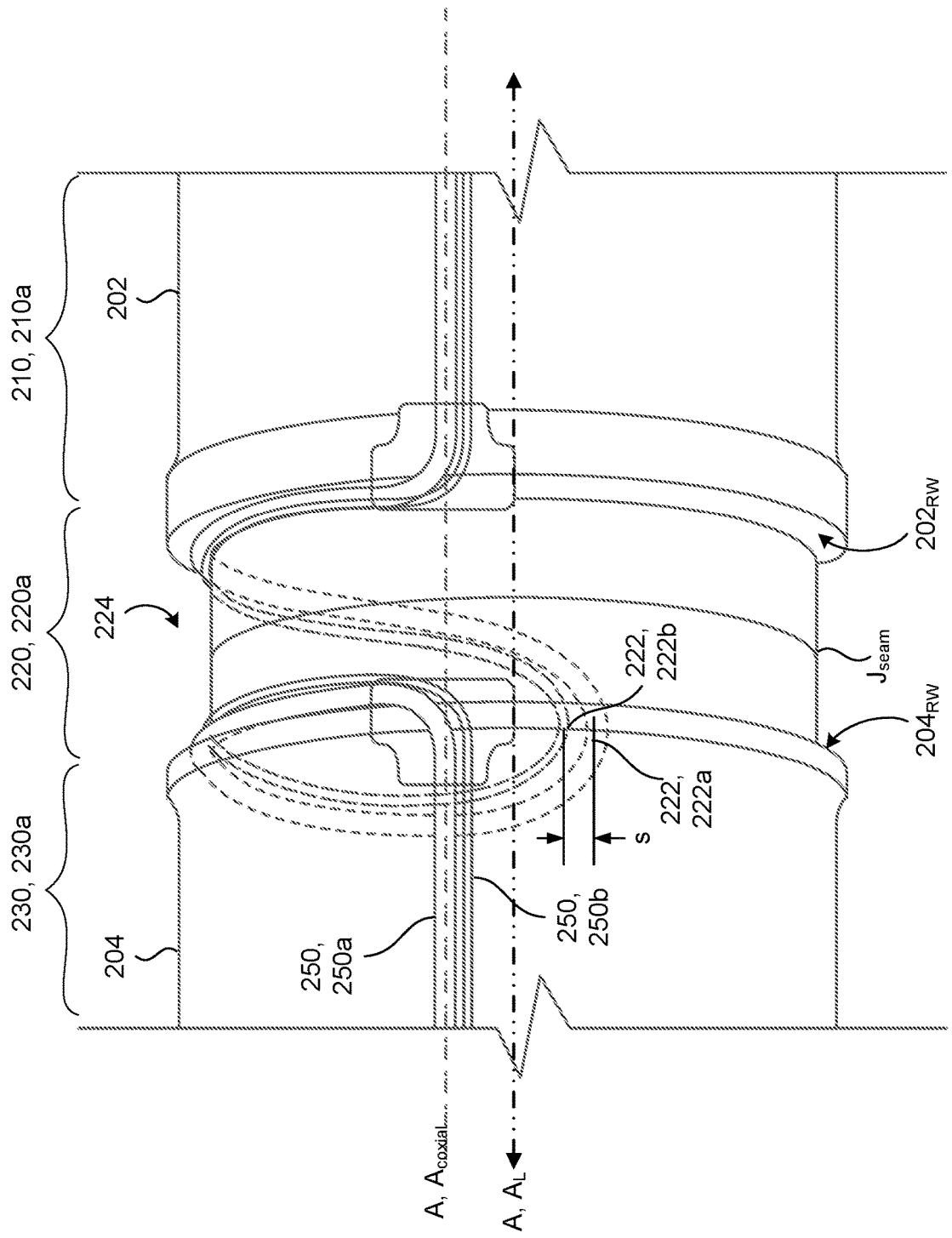

In some implementations, the total length of the wire 250 in the omega section 220 of the wire routing 200, or some portion thereof, is configured to correspond to the range of motion (ROM) for the output link 204 to rotate relative to the input link 202. For instance, FIGS. 2C-2E depict an output link 202 with a ROM of about 700-720 degrees. In other words, since the wire routing 200 wraps around some portion of each of the input link 202 and the output link 204 in the omega section 220, the total wrap length of the wire routing 200 in the omega section 220 may be about equivalent to half of the maximum ROM that the output link 204 can achieve without potentially damaging the wire routing 200. For instance, in FIG. 2B, the single wire 250 of the wire routing 200 wraps about 180 degrees around the input link 202 (e.g., shown as the second length of the second segment 252b), extends some length across the joint seam $J_{seam}$ (e.g., shown as a third length of the third segment 252c), and wraps back around the output link 204 in the opposite direction that it wrapped around the input link 202 about another 180 degrees (e.g., shown as the fourth length of the fourth segment 252d).

FIGS. 2C and 2D illustrate the rotation of the output link 204 about 360 degrees in one direction (e.g., the output link 204 rotates counterclockwise to the position shown in FIG. 2C) or about 360 degrees in the opposite direction (e.g., the output link 204 rotates clockwise to the position shown in FIG. 2D). With about 360 degrees in each direction, the total ROM is about 720 degrees. Here, half of the total ROM, or 360 degrees, corresponds to the combined length of the second segment 252b, the third segment 252c, and the fourth segment 252d. This means that if the wire routing 200 is configured such that the second length of the second segment 252b is equal or about equal to the fourth length of the fourth segment 252d (e.g., as shown in FIG. 2B), the output link 204 can rotate an equal amount in each direction. In other words, this configuration may be convenient to set the midpoint for the ROM of the output link 204 to ensure equal rotation in each direction. Referring further to FIG. 2C, when the output link 204 rotates to one limit of the ROM, the majority of the wire 250 is located on the output link 204 while only a small amount of wire 250 will be located on the input link 202. In other words, during the ROM to the limit of the ROM, the wire 250 has unwound from the input link 202 and wound itself on the output link 204. For example, FIG. 2C illustrates the length of the fourth segment 252d increasing by about the length of the second segment 252b shown in FIG. 2B. In contrast, when the output link 204 rotates to the opposite limit of the ROM shown in FIG. 2D, the majority of the wire 250 is located on the input link 202 while only a small amount of wire 250 is located on the output link 204. In other words, during the ROM to the other limit of the ROM, the wire 250 has unwound from the output link 204 and wound itself on the input link 202. For example, FIG. 2D illustrates the length of the second segment 252d increasing by about the length of the fourth segment 252b shown in FIG. 2B.

In some configurations, the omega section 220 includes a groove 224 or a recess such that the coupling of the input link 202 and the output link 204 at the twist joint $J_T$ resembles a sheave of a pulley. By having a groove 224, the wire(s) 250 of the wire routing 200 recessed into the groove in the omega section 220 such that during rotation of the output link 204, the wire(s) are less likely to interfere (e.g., to snag or to catch) with some element of the environment 30. In some examples, the groove 224 is recessed from an outer surface of the input link 202 and/or output link 204 by a height 224h. For example, the groove 224 is configured to have a height 224h that is greater than or equal to the largest diameter wire 250 associated with the wire routing 200. With the height 224h being greater than or equal to the largest diameter wire 250 associated with the wire routing 250, the groove 224 prevents wire(s) from riding over (i.e., exiting) the groove 224 when wire(s) 250 undergo stress and strain from rotation of the output link 204 or other motions of the arm 126. When the omega section 220 includes the groove 224 or recessed channel, the routing guide 240 may be positioned such that the routing guide 240 guides or steers the wire(s) 250 of the wire routing 200 into the groove 224 (e.g., in some designated order). When there are multiple wires 250a—n as shown in FIGS. 2E and 2F, the routing guide 240 may order the wires 250 to prevent one or more wires 250 from moving into an overlapped position or otherwise twisting with another wire. For instance, the routing guide 240 designates that a larger wire 250 separates smaller wires 250 such that larger wire 250 serves as a barrier to prevent the smaller wires 250 from significantly moving or shifting out of place. When the wire(s) 250 of the wire routing 200 sit in the groove 224, the wire(s) 250 may be configured to rest against a recess wall $202_{RW}$, $204_{RW}$ of either the input link 202 or the output link 204. Here, the height of each recess wall $202_{RW}$, $204_{RW}$ corresponds to the groove height $224h$. In some configurations, the start and the end of the omega section 220 may be considered to extend from the recess wall $202_{RW}$ of the input link 202 to the recess wall $204_{RW}$ of the output link 204.

Referring further to FIGS. 2E and 2F, the wire routing 200 may have different configurations to in the omega section 220 to accommodate for different needs, such as real estate to traverse wires 250 over the joint seam $J_{seam}$. For instance, FIG. 2E is a nested configuration where multiple wires 250 of the wire routing 200 are strategically nested together with precise spacing to ensure the twist joint $J_T$ achieves a particular ROM. More particularly, this spacing technique in a nested configuration is apparent by the spacing "s" between the first apex 222a of the first wire 250a and second apex 222b of the second wire 250b. Although FIG. 2E depicts a nesting configuration with two wires 250a-b, the nesting configuration may be scaled to include more wires 250 being conscientious of the spacing s between each wire 250 and the length of each wire 250 with respect to the ROM for the twist joint $J_T$.

FIG. 2F depicts another configuration called a back-to-back configuration in conjunction with a nested configuration to illustrate that these configurations may be compounded although they also may be used independently (not shown). In a back-to-back configuration, there may be two omega loops 226, 226a-b in the omega section 220 such that one omega loop 226 wraps around the input link 202 in a first direction (e.g., clockwise) and the output link 204 in a second direction opposite the first direction (e.g., counterclockwise) while the second omega loop 226 wraps around the input link 202 in the second direction (e.g., counterclockwise) and the output link 204 in the first direction (e.g., clockwise). Here, both loops are shown with two wires 250a-d. The back-to-back configuration capitalizes on the fact that a single loop 226 in a configuration like FIG. 2B only needs to wrap around a link 202, 204 about 180 degrees to achieve about 700-720 degrees of motion. This means that the input/output links 202, 204 still have about half of their circumferences available to support addition wiring of the wire routing 200.

Figure 3:
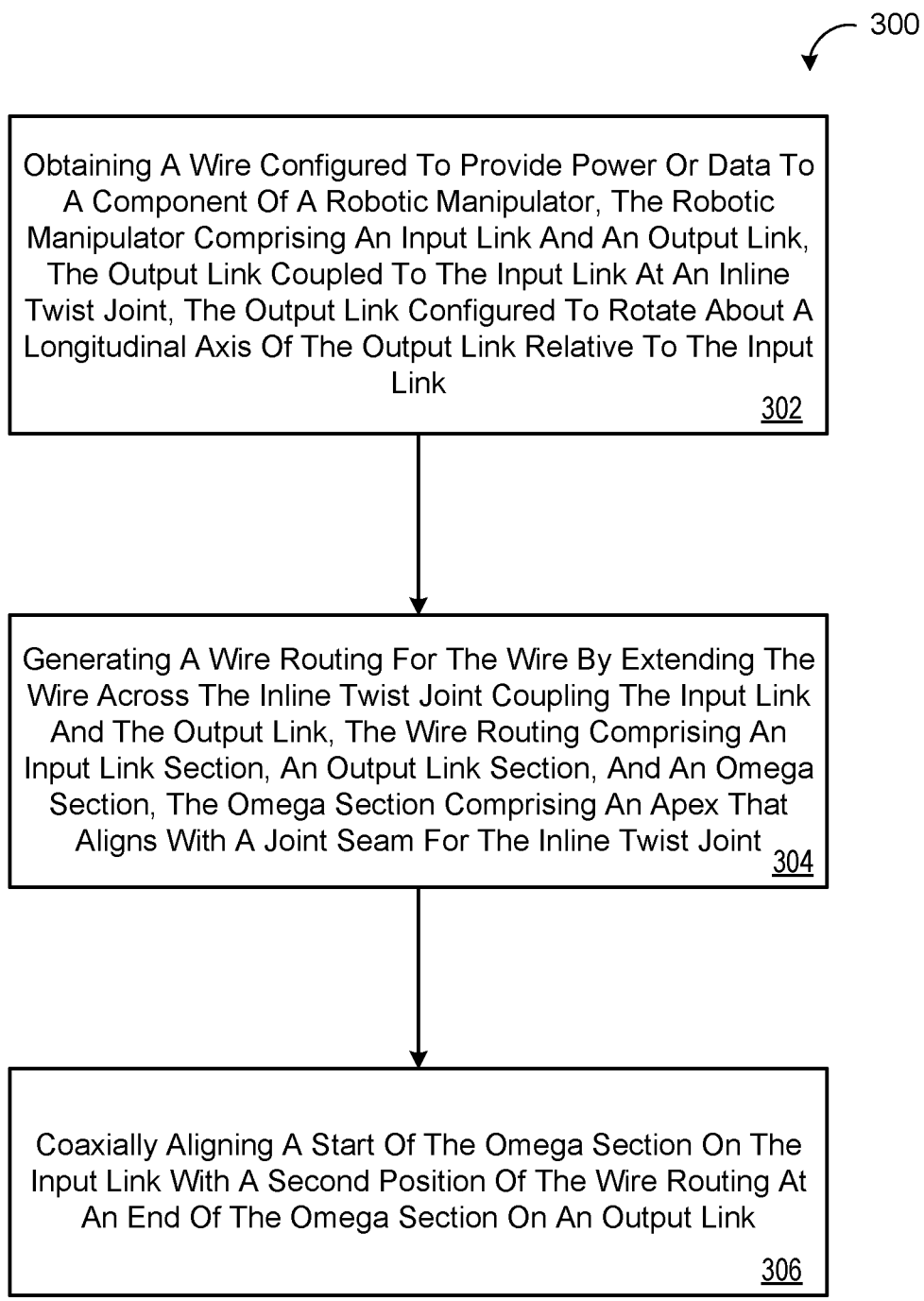
FIG. 3 is a flow chart of an example arrangement of operations for a method generating a wire routing across a twist joint of a robot.

FIG. 3 is a flow chart of an example arrangement of operations for a method 300 generating a wire routing 200 across a twist joint $J_T$ of a robot 100. At operation 302, the method 300 obtains a wire 250 configured to provide power or data to a component of a robotic manipulator 126 where the robotic manipulator 126 includes an input link 202 and an output link 204. The output link 204 coupled to the input link 202 at an inline twist joint $J_T$. The output link 204 is configured rotate about a longitudinal axis $A_L$ of the output link 204 relative to the input link 202. At operation 304, the method 300 generates a wire routing 200 for the wire 250 by extending the wire 250 across the inline twist joint $J_T$ coupling the input link 202 and the output link 204. The wire routing 200 includes an input link section 210, an output link section 220, and an omega section 230. The omega section 230 may include an apex 222 that aligns with a joint seam $J_{seam}$ for the inline twist joint $J_T$. At operation 306, the method 300 coaxially aligns a start of the omega section 230 on the input link 202 with a second position of the wire routing 200 at an end of the omega section 230 of an output link 204.

Figure 4:
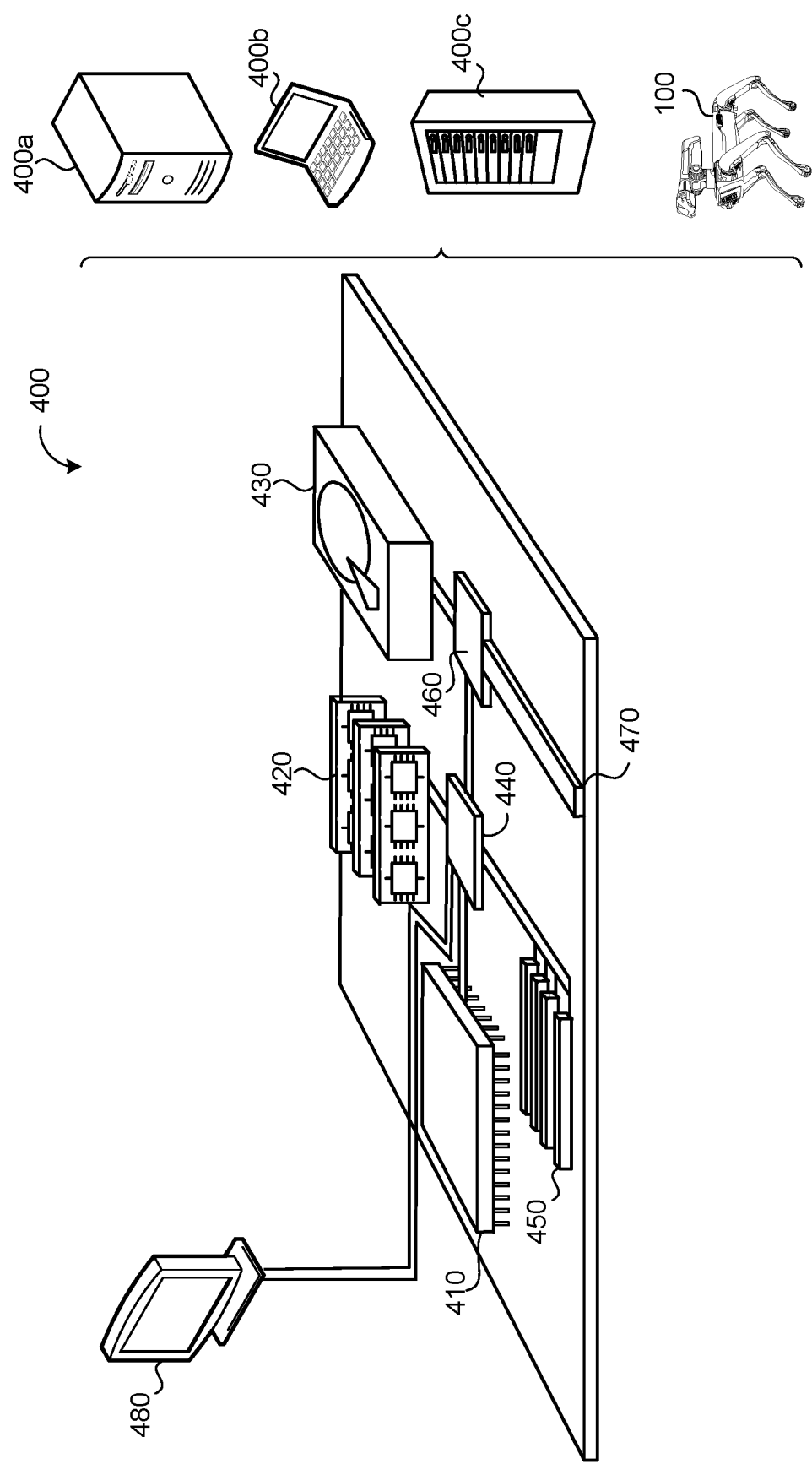
FIG. 4 is a schematic view of an example computing device that may be used to implement the systems and methods described herein.

FIG. 4 is schematic view of an example computing device 400 that may be used to implement the systems and methods described in this document. The computing device 400 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 400 includes a processor 410 (e.g., data processing hardware), memory 420 (e.g., memory hardware), a storage device 430, a high-speed interface/controller 440 connecting to the memory 420 and high-speed expansion ports 450, and a low speed interface/controller 460 connecting to a low speed bus 470 and a storage device 430. Each of the components 410, 420, 430, 440, 450, and 460, are interconnected using various busses, and may be mounted on a common motherboard or in other manners as appropriate. The processor 410 can process instructions for execution within the computing device 400, including instructions stored in the memory 420 or on the storage device 430 to display graphical information for a graphical user interface (GUI) on an external input/output device, such as display 480 coupled to high speed interface 440. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 420 stores information non-transitorily within the computing device 400. The memory 420 may be a computer-readable medium, a volatile memory unit(s), or non-volatile memory unit(s). The non-transitory memory 420 may be physical devices used to store programs (e.g., sequences of instructions) or data (e.g., program state information) on a temporary or permanent basis for use by the computing device 400. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 430 is capable of providing mass storage for the computing device 400. In some implementations, the storage device 430 is a computer-readable medium. In various different implementations, the storage device 430 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 420, the storage device 430, or memory on processor 410.

The high speed controller 440 manages bandwidth-intensive operations for the computing device 400, while the low speed controller 460 manages lower bandwidth-intensive operations. Such allocation of duties is exemplary only. In some implementations, the high-speed controller 440 is coupled to the memory 420, the display 480 (e.g., through a graphics processor or accelerator), and to the high-speed expansion ports 450, which may accept various expansion cards (not shown). In some implementations, the low-speed controller 460 is coupled to the storage device 440 and a low-speed expansion port 490. The low-speed expansion port 490, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 400a or multiple times in a group of such servers 400a, as a laptop computer 400b, as part of a rack server system 500c, or as part of the robot 100.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A robot comprising:
a body;
a plurality of legs coupled to the body; and
a robotic manipulator coupled to the body and comprising:
an input link;
an output link coupled to the input link at a boundary, the output link configured to rotate about a longitudinal axis of the output link relative to the input link;
a groove recessed from an outer surface of the input link and an outer surface of the output link, the groove traversing the boundary; and
a wire routing traversing the boundary and within the groove, the wire routing having an apex that aligns radially with the boundary between the output link and the input link, the wire routing transitioning between wrapping around the groove in a first direction and wrapping around the groove in a second direction at the apex.

2. The robot of claim 1, wherein the robotic manipulator further comprises a wire routing guide coaxially aligning a first portion of the wire routing at a start of the apex with a second portion of the wire routing at an end of the apex.

3. The robot of claim 1, wherein a first portion of the groove is formed in the input link and a second portion of the groove is formed in the output link, wherein the groove is adjacent to a joint seam defined by the boundary.

4. The robot of claim 1, wherein the wire routing comprises at least one wire forming a loop forming the apex, the loop comprising a first segment, a second segment, and a third segment, and wherein a length of the loop corresponds to a range of motion for the output link to rotate about the longitudinal axis of the output link relative to the input link.

5. The robot of claim 4, wherein the at least one wire comprises a first wire and a second wire spaced apart at the apex.

6. The robot of claim 1, wherein a first portion of the groove is formed in the input link and a second portion of the groove is formed in the output link, wherein the wire routing wraps around the first portion of the groove when the output link is rotated to a first position relative to the input link, and wherein the wire routing wraps around the second portion of the groove when the output link is rotated to a second position relative to the input link.

7. The robot of claim 6, wherein the wire routing wraps in a clockwise direction when the output link is in the first position, and in a counterclockwise direction when the output link is in the second position.

8. The robot of claim 6, wherein the first position and the second position are separated by at least 700 degrees.

9. The robot of claim 1, wherein the wire routing comprises a first wire forming a first loop and a second wire forming a second loop, the first loop and the second loop wrapping around the groove in opposite directions.

10. A robotic manipulator comprising:
an input link;
an output link coupled to the input link at a boundary, the output link configured to rotate about a longitudinal axis of the output link relative to the input link;
a groove recessed from an outer surface of the input link and an outer surface of the output link, the groove traversing the boundary; and
a wire routing traversing the boundary and within the groove, the wire routing having an apex that aligns radially with the boundary between the output link and the input link, the wire routing transitioning between wrapping around the groove in a first direction and wrapping around the groove in a second direction at the apex.

11. The robotic manipulator of claim 10, further comprising a wire routing guide coaxially aligning a first portion of the wire routing at a start of the apex with a second portion of the wire routing at an end of the apex.

12. The robotic manipulator of claim 10, wherein a first portion of the groove is formed in the input link and a second portion of the groove is formed in the output link, wherein the groove is adjacent to a joint seam defined by the boundary.

13. The robotic manipulator of claim 10, wherein the wire routing comprises at least one wire forming a loop forming the apex, the loop comprising a first segment, a second segment, and a third segment, and wherein a length of the loop corresponds to a range of motion for the output link to rotate about the longitudinal axis of the output link relative to the input link.

14. The robotic manipulator of claim 13, wherein the at least one wire comprises a first wire and a second wire spaced apart at the apex.

15. The robotic manipulator of claim 10, wherein a first portion of the groove is formed in the input link and a second portion of the groove is formed in the output link, wherein the wire routing wraps around the first portion of the groove when the output link is rotated to a first position relative to the input link, and wherein the wire routing wraps around the second portion of the groove when the output link is rotated to a second position relative to the input link.

16. The robotic manipulator of claim 15, wherein the wire routing wraps in a clockwise direction when the output link is in the first position, and in a counterclockwise direction when the output link is in the second position.

17. The robotic manipulator of claim 15, wherein the first position and the second position are separated by at least 700 degrees.

18. The robotic manipulator of claim 10, wherein the wire routing comprises a first wire forming a first loop and a second wire forming a second loop, the first loop and the second loop wrapping around the groove in opposite directions.

19. A method comprising:
obtaining a wire configured to provide power or data to a component of a robotic manipulator of a robot, the robot comprising a body, a plurality of legs coupled to the body, and the robot manipulator coupled to the body, the robotic manipulator comprising an input link, an output link coupled to the input link at a boundary, and a groove recessed from an outer surface of the input link and an outer surface of the output link and traversing the boundary, the output link configured to rotate about a longitudinal axis of the output link relative to the input link;
generating a wire routing for the wire by extending the wire across the boundary, the wire routing traversing the boundary and within the groove, the wire routing having an apex that aligns radially with the boundary between the output link and the input link, the wire routing transitioning between wrapping around the groove in a first direction and wrapping around the groove in a second direction at the apex;
coaxially aligning a start of the apex on the input link with an end of the apex on the output link; and
rotating the output link while the apex remains aligned radially with the boundary.

20. The method of claim 19, wherein the robotic manipulator further comprises a wire routing guide coaxially aligning a first portion of the wire routing at a start of the apex with a second portion of the wire routing at an end of the apex.

* * * * *